US006993620B2

(12) United States Patent
Ferguson

(10) Patent No.: US 6,993,620 B2
(45) Date of Patent: Jan. 31, 2006

(54) USER RESOURCE SHARING THROUGH THE USB INTERFACE

(75) Inventor: Patrick Lee Ferguson, Cypress, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 221 days.

(21) Appl. No.: 10/461,895

(22) Filed: Jun. 13, 2003

(65) Prior Publication Data

US 2004/0268012 A1 Dec. 30, 2004

(51) Int. Cl.
*G06F 13/20* (2006.01)
*G06F 13/42* (2006.01)
(52) U.S. Cl. ...................... 710/313; 710/106
(58) Field of Classification Search ............... 710/305, 710/313, 106
See application file for complete search history.

(56) References Cited

U.S. PATENT DOCUMENTS

| 6,256,014 B1 * | 7/2001 | Thomas et al. ............. 345/163 |
| 6,304,895 B1 * | 10/2001 | Schneider et al. .......... 709/203 |
| 6,446,155 B1 * | 9/2002 | Maggi et al. ............... 710/313 |
| 6,671,756 B1 * | 12/2003 | Thomas et al. ............... 710/73 |
| 6,708,247 B1 * | 3/2004 | Barret et al. ................ 710/313 |
| 6,772,253 B1 * | 8/2004 | Slaight et al. .............. 710/105 |
| 2002/0097220 A1 * | 7/2002 | Ferguson et al. ........... 345/156 |
| 2003/0163627 A1 * | 8/2003 | Deng et al. ................. 710/305 |
| 2004/0205276 A1 * | 10/2004 | Ferguson .................... 710/305 |

* cited by examiner

Primary Examiner—Rehana Perveen
Assistant Examiner—Jeremy S. Cerullo

(57) ABSTRACT

A method of sharing user resources in a computer system through a universal serial bus (USB) interface. The method may involve, not necessarily in this order, associating at least one USB device with a first user and at least another USB device with a second user; assigning the first user to a first USB port; assigning the second user to a second USB port; permitting the first user to temporarily assume control of the computer system through the first USB port for operation of the at least one USB device; and blocking the second user from access to the computer system while the first user has temporary control of the computer system.

11 Claims, 5 Drawing Sheets

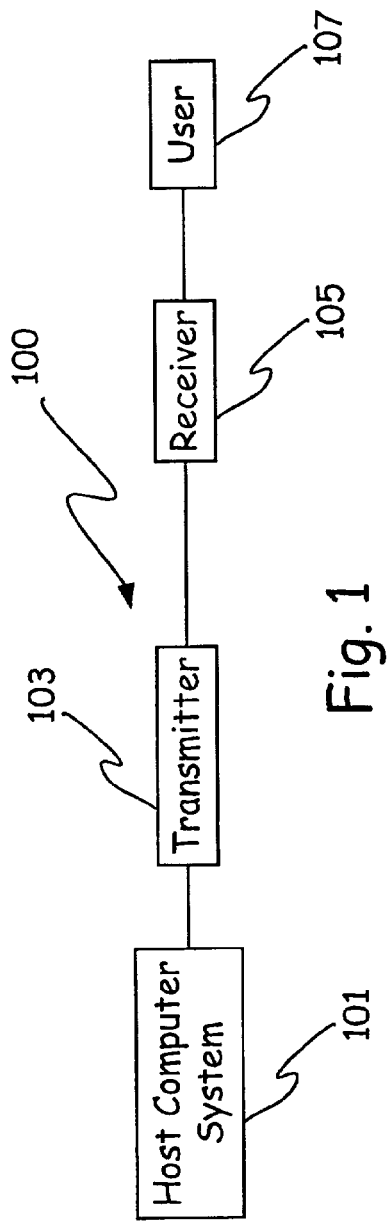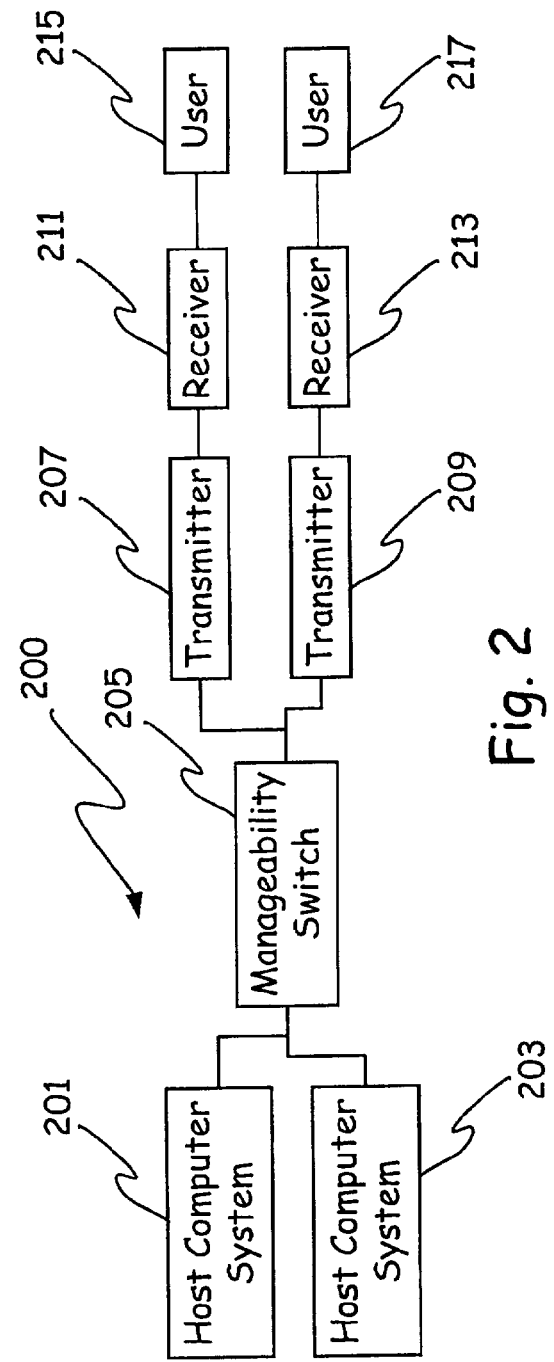

USER RESOURCE SHARING THROUGH THE USB INTERFACE

CROSS-REFERENCE TO RELATED APPLICATIONS

The present application is related to the following U.S. applications which are incorporated herein in their entireties: U.S. application Ser. No. 10/413,332, filed Apr. 14, 2003, entitled "USB Interface Extension Through Split Transaction Protocol" by Ferguson; U.S. application Ser. No. 10/410,541, filed Apr. 9, 2003, entitled "Extension of USB Functionality Through Shadowing of a Remote USB Host Controller" by Ferguson; and U.S. application Ser. No. 10/410,534, filed Apr. 9, 2003, entitled "Method of KVM Extension Using USB to Legacy Adapters" by Ferguson.

BACKGROUND OF INVENTION

1. Field of the Invention

The present disclosure relates generally to increasing the functionality of a computer USB port and, more specifically, to implementing the switching of USB devices between users without the need for a separate switching device.

2. Description of the Related Art

Preventing multiple users from simultaneously accessing computer resources is a problem in USB computer system architectures. This problem becomes increasingly advanced when users access peripherals in computer interface extension solutions. For example, a standard computer interface, or a keyboard, video display and a mouse, must be located close to the computer to which it is attached. A keyboard/video/mouse (KVM) extender enables a computer interface to be located at a greater distance from the computer than is typically possible with a standard interface. For example, a company can place all its employees' computers in a rack-mounted system in a locked room and yet still provide a standard KVM interface at each employee's desk. To the employee, it appears as though the computer is still located at the employee's desk. This centralization of computers enables companies to maintain tighter security over their computers and also simplifies the computers' maintenance by locating them in a single place.

In addition, a KVM switch can enable multiple computers to be accessed by means of a single set of keyboard, video display and mouse. This is convenient in the situation in which a user accesses multiple computers such as an application server, a web or email server and a game box. With a KVM switch, the user can access multiple computers with a single interface, thus reducing the cost of both components and maintenance.

Although, the KVM extension mode of operation typically supports some standard user I/O protocols, or "legacy" protocols, such as PS/2, analog video, and serial communications, a universal serial bus (USB) connection presents several problems. Most interface extensions such as KVM use simple, low frequency data rates and protocols, whether using either analog or digital signal types. However, USB has a very complex signaling protocol, data packet structure and electrical specification, as well as short latency requirements. The USB standard requires strict adherence to these transaction latency and electrical requirements, which limits the USB extension distance, rather than allow the several hundred meters of a typical KVM mode.

In addition, the USB requirements prevent the use of a KVM switch because a switch may degrade the USB signaling and further reduce the overall extension distance. KVM interfaces also enable multiple users to simultaneously access a single computer system which aggravates the problems of a KVM switch when USB signaling is introduced. Old methods of switching PS/2 keyboard and mouse interfaces include physically passing a keyboard and mouse from user to user. In another solution, a PS/2 switch has the ability to block devices to a user when another user's device is in operation to avoid user contention. One obvious disadvantage of the these old methods is that all but one user is blocked while another user controls the computer.

Many other problems and disadvantages of the prior art will become apparent to one skilled in the art after comparing such prior art with the present invention as described herein.

BRIEF DESCRIPTION OF THE FIGURES

A better understanding of the present invention can be obtained when the following detailed description in conjunction with the following figures.

FIG. 1 is a block diagram of a basic computer interface extension solution in accordance with embodiments of the present invention.

FIG. 2 is a block diagram of another basic computer interface extension solution wherein a manageability switch is introduced into the solution in accordance with embodiments of the present invention.

The components in the figures are not necessarily to scale, emphasis instead being placed upon illustrating the principles of the invention. In the figures, like reference numerals designate corresponding parts throughout the different views.

DETAILED DESCRIPTION OF THE PREFERRED EMBODIMENT

Figure 3:
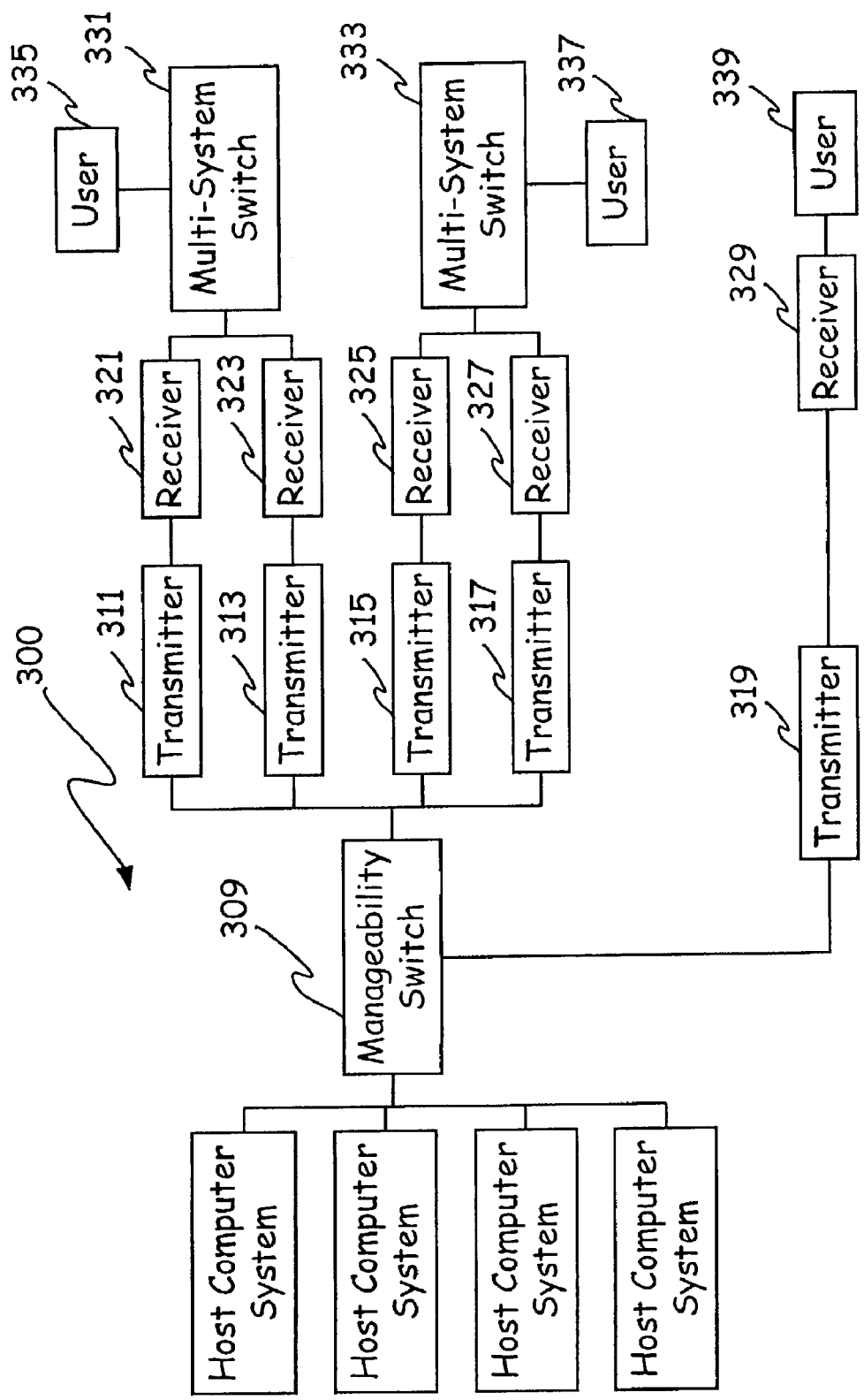
FIG. 3 is a block diagram of a computer interface extension solution wherein a manageability switch and multi-system switches are introduced into the solution in accordance with embodiments of the present invention.

Certain but not other aspects of the invention are realized through a method of sharing user resources in a computer system through a universal serial bus (USB) interface. The method may involve, not necessarily in this order, associating at least one USB device with a first user and at least another USB device with a second user; assigning the first user to a first USB port; assigning the second user to a second USB port; permitting the first user to temporarily assume control of the computer system through the first USB port for operation of the at least one USB device; and blocking the second user from access to the computer system while the first user has temporary control of the computer system.

In certain but not other embodiments, the blocking of the second user from access to the computer system is limited to devices assigned to the first user. In some instances, the at least one USB device of the method is selected from the group consisting of a keyboard, a mouse, a joystick, and a USB human interface class device. The blocking of the method typically requires identification of the at least one device and may includes a number of different identification techniques. For example, the identification of the at least one device could include identifying a device class for the at least one device, it could include identifying the device through an application program that is resident on the computer system, it could include monitoring a USB device driver for the at least one USB device, or it could include snooping of USB transactions that occur between the at least one USB device and the computer system.

Still other aspects of the present invention are realized through a USB communication system for sharing user resources. The USB communication system may include a host computer system having a USB host controller, a first USB hub circuitry, and transmitter circuitry. The USB host controller may be configured to operate using a split transaction for the USB communications. In the illustrated embodiment, the USB communication system also includes receiver circuitry that has a second USB hub circuitry for receiving a non-USB format of USB communication signals as the signals appear between split start and split complete transaction operations at the host computer system. The illustrated transmitter circuitry is configured to forward the non-USB formatted USB communication signals across an extension between the transmitter circuitry and the receiver circuitry. A user transaction lockout filter may be placed between the first USB hub circuitry and the second USB hub circuitry that performs snooping of the USB communication signals that appear between the split start and the split complete transaction operations at the host computer system. At least one USB user interface device is communicatively coupled to the receiver circuitry and receives USB communication signals from the second USB hub circuitry. These USB communication signals may correspond to the non-USB formatted communication signals that appear between the split start and split complete transaction operations at the host computer system. One or more users may share the host computer system through the receiver circuitry and the transmitter circuitry.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

FIG. 1 is a block diagram of a basic computer interface extension solution 100 according to principles of the present invention. Although the solution 100 is illustrated as having a host computer system 101 with an extension transmitter 103 (herein referred to as "transmitter"), for ease of understanding certain but not other principles of the present invention, the solution 100 is illustrative of only one of many embodiments that may be realized in accordance with principles of the present invention. The transmitter 103 is connected to an extension receiver 105 (herein referred to as "receiver") which is connected to a user 107. The user 107 is representative of standard user interface products such as a keyboard, mouse, monitor, serial port, audio devices, USB ports, etc. The solution 100 is commonly implemented as a KVM extension, however, as will be understood when viewing the description of the invention, the solution 100 includes more than typical KVM extension capabilities. For example, as described in greater detail herein, the same type of switching currently employed for PS/2 switching is implemented with USB interface devices. The flexibility and expandability of USB is used to assign individual ports to different users which allows enhanced switching control through the USB operational model. The USB switch is embedded in the USB topology and removes the need for a separate switching device. Further, although data travels bi-directionally between the host computer system 101 and the user 107, in accordance with USB specification terminology, the transmitter 103 and the receiver 105 are labeled as though data transfer occurs only in one direction, i.e., from the host computer system 101 to the user 107.

The transmitter 103 and receiver 105 are connected with a single cable such as a cable compatible with all versions of category 5, 6, 7, or better cables. The connection could also be made with fiber optic or other type of high speed data transmission cabling. The distance between the transmitter 103 and receiver 105 ranges approximately 300 meters. In this manner are the user interface devices of the user 107 allowed to communicate effectively with the host computer system 101 across long distances, "long" as compared to user/host communication distances in a system without the transmitter 103/receiver 105 pair. Although illustrated external to the host 101, the transmitter 103 may be positioned internal to the host computer system 101 and use an internal connector with the motherboard of the system 101.

FIG. 2 is a block diagram of another basic computer interface extension solution 200 wherein a manageability switch 205 is introduced into the solution, which includes multiple host computer systems 201 and 203. The solution 200 also includes multiple transmitters 207 and 209, and multiple receivers 211 and 213 that support the communication extension for multiple users 215 and 217, respectively. The manageability switch 205 encompasses technology used to map a specific user to a specific system, to converge a large number of systems to a small number of users for system administration or head trader access, and to share a single system between two or more users.

FIG. 3 is a block diagram of a computer interface extension solution 300 wherein a manageability switch 309 and multi-system switches 331 and 333 are introduced into the solution 300. The multi-system switches 331 and 333 enable users 335 and 337 to access multiple transmitter/receiver pairs; i.e. a transmitter/receiver pair 311 and 321 and a transmitter/receiver pair 313 and 323 in the case of user 335 and a transmitter/receiver pair 315 and 325 and a transmitter/receiver pair 317 and 327 in the case of user 337. An administrative user 339 is also illustrated that provides the capability to monitor the users 337 and 335 and make adjustments to the solution 300 configuration if necessary. The administrative user 339 accesses the manageability switch 309 via a transmitter/receiver pair 319 and 329.

In general, users are assigned to each USB port such that each user's collection of ports may be used to assume control of the user interface of a host computer system 341 and temporarily block other users for a specified period of time. In the illustrated embodiment, blocking is limited to devices assigned to the user. This includes but is not limited to keyboard, mouse, joystick, and USB HID (human interface device) class devices. The operation requires the identification of a device and device class through host applications, through USB device drivers, through snooping of USB transactions, or any combination of hardware and software tools to identify the device and/or the device class.

Figure 7:
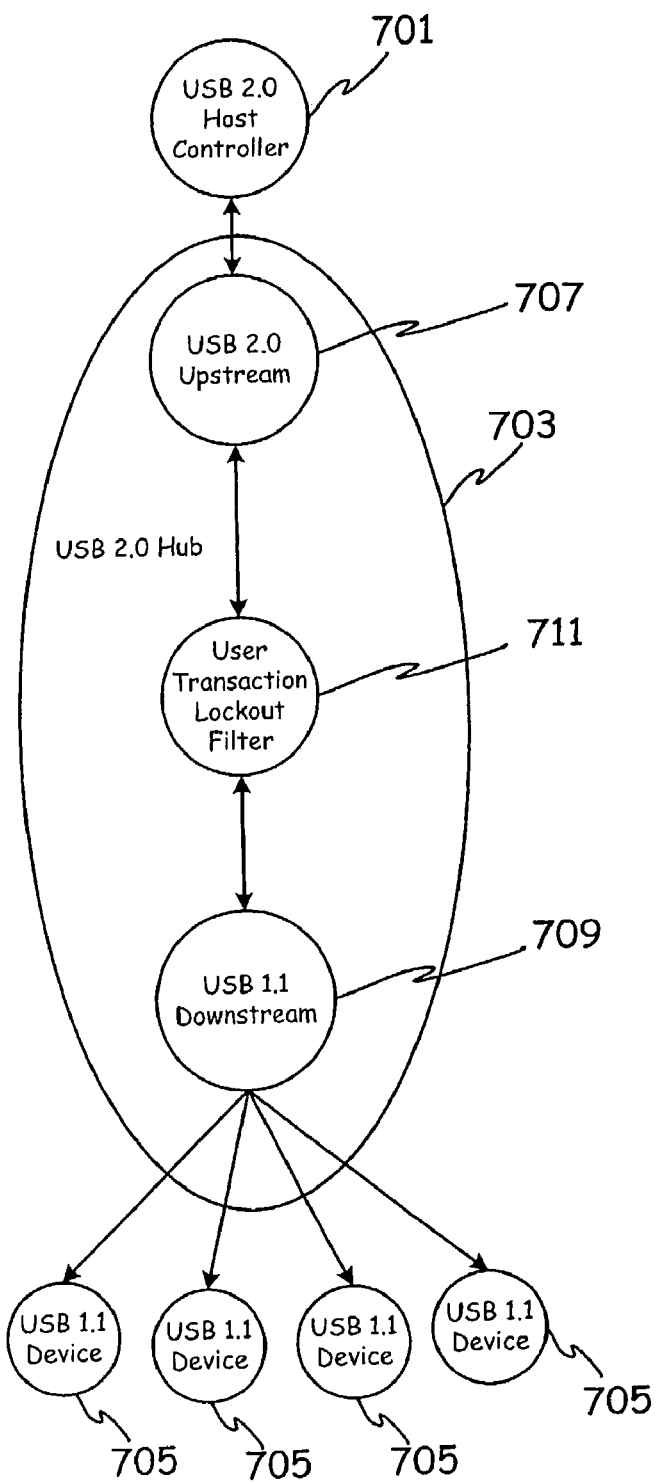
FIG. 7 is a diagram of data flow of the method of the claimed subject matter as it applies to a USB multi-user switch in accordance with embodiments of the present invention.

Once devices are identified and assigned to users, transactions to and from the devices can be monitored by a device on the bus, such as a hub 703 (see FIG. 7). The hub 703 then identifies which device is in communication to the host via non-NAK ("negative acknowledgement") responses, i.e., real data, and assigns the user that owns that device control of the host computer system 341 by temporarily disabling the downstream ports assigned to other users to prevent responses. All device addresses downstream of temporarily disabled ports must be known and transactions addressed to these devices must respond with a NAK handshake to avoid the disconnect of the device for lack of response. In the meantime, all temporarily disabled ports should forward a token of some sort, generate bogus transactions, or other meaningless activity to avoid being put into suspend mode. Although described in relation to the illustrated hub 703, the user switch hub may be implemented at any point in the USB topology, including the root hub.

Figure 4:
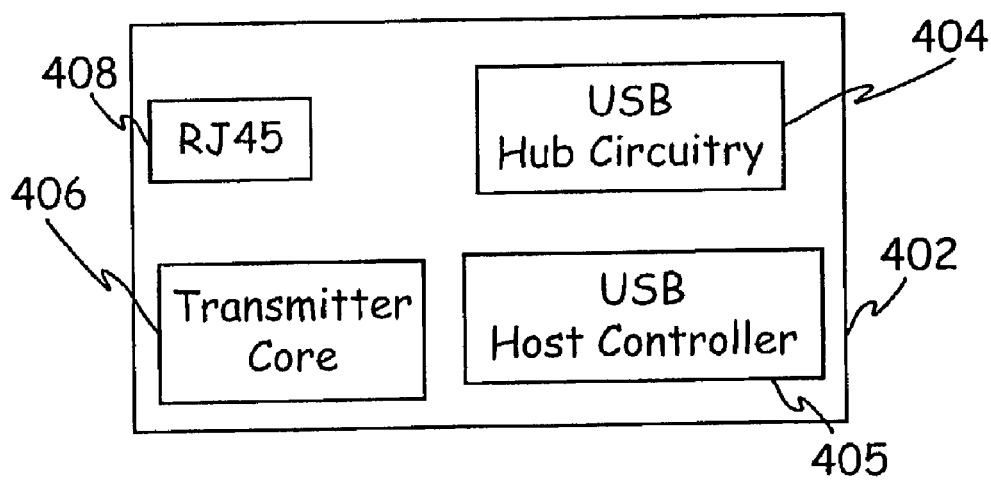
FIG. 4 is a simplified block diagram of exemplary transmitter circuitry components that are used in an extension transmitter in accordance with embodiments of the present invention.

FIG. 4 is a simplified block diagram of exemplary transmitter circuitry components 402 that are used in an extension transmitter (e.g., transmitter 103) according to certain but not other principles of the present invention. The transmitter circuitry components 402 employ the techniques of the claimed subject matter. The transmitter circuitry components 402 are configured to support the transmitter 103 in an extension solution such as the extension solution 100. However, unlike transmitter circuitry of the prior art, the transmitter circuitry 402 includes a USB hub 404 and USB host controller 405. The USB hub and host controller 404 and 405 are introduced such that the transmitter circuitry components 402 operate with a USB protocol to support USB devices such as a keyboard and mouse operating at the user 107 end of the solution 100. The transmitter components 402 also include a transmitter core 406 and a communication link to a receiver, e.g., receiver 105, represented by RJ45 connector 408.

Figure 5:
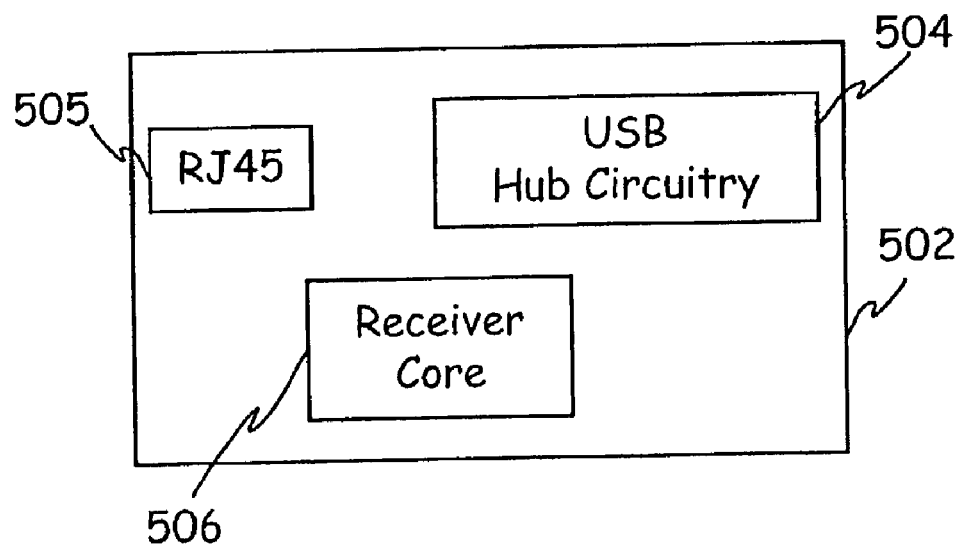
FIG. 5 is a simplified block diagram of exemplary receiver circuitry components that are used in an extension receiver in accordance with embodiments of the present invention.

FIG. 5 is a simplified block diagram of exemplary receiver circuitry components 502 that are used in an extension receiver (e.g., receiver 105) that operates according to and complements the transmitter circuitry components 402. The receiver circuitry components 502 include a USB hub component 504, a receiver core 506, and a communication link represented by RJ45 connector 505. Due at least in part to the transmitter core 406, the USB hub 404 operation is as defined in USB 2.0 specification chapter 11 which describes the USB 2.0 to 1.1 translation requirements for split transactions.

The split transaction protocol defined in the USB 2.0 specification defines the converting of transactions between 2.0 signaling and 1.1 signaling through a hub. The transmitter 402 implements the USB hub 404 which attaches using 2.0 signaling to the host controller 405. All devices downstream from the transmitter hub 404 attach as 1.1 devices, thus requiring the split transaction protocol as defined in the USB 2.0 specification and described further herein. The split transaction protocol defines separate start and complete transactions between the host controller 405 and the 2.0 hub to allow the slower USB 1.1 transaction to be completed downstream from the transmitter hub 404.

This split transaction format provides an opportunity to hide the extension electrical layer and latency. The transaction requests and responses are transported across the extension media to and from the receiver in a non-USB format where the transaction is re-initiated as USB 1.1 transactions.

The transmitter circuitry 402 manages the upstream 2.0 communication and the receiver circuitry 502 manages the downstream 1.1 communication. The extension latency is absorbed in the latency between the start and compete split transactions which tolerate the additional latency and the true bus transaction latency still meets the USB specification since it is contained entirely between the receiver and the local downstream devices (e.g., between the receiver 105 and the user 107).

Figure 6:
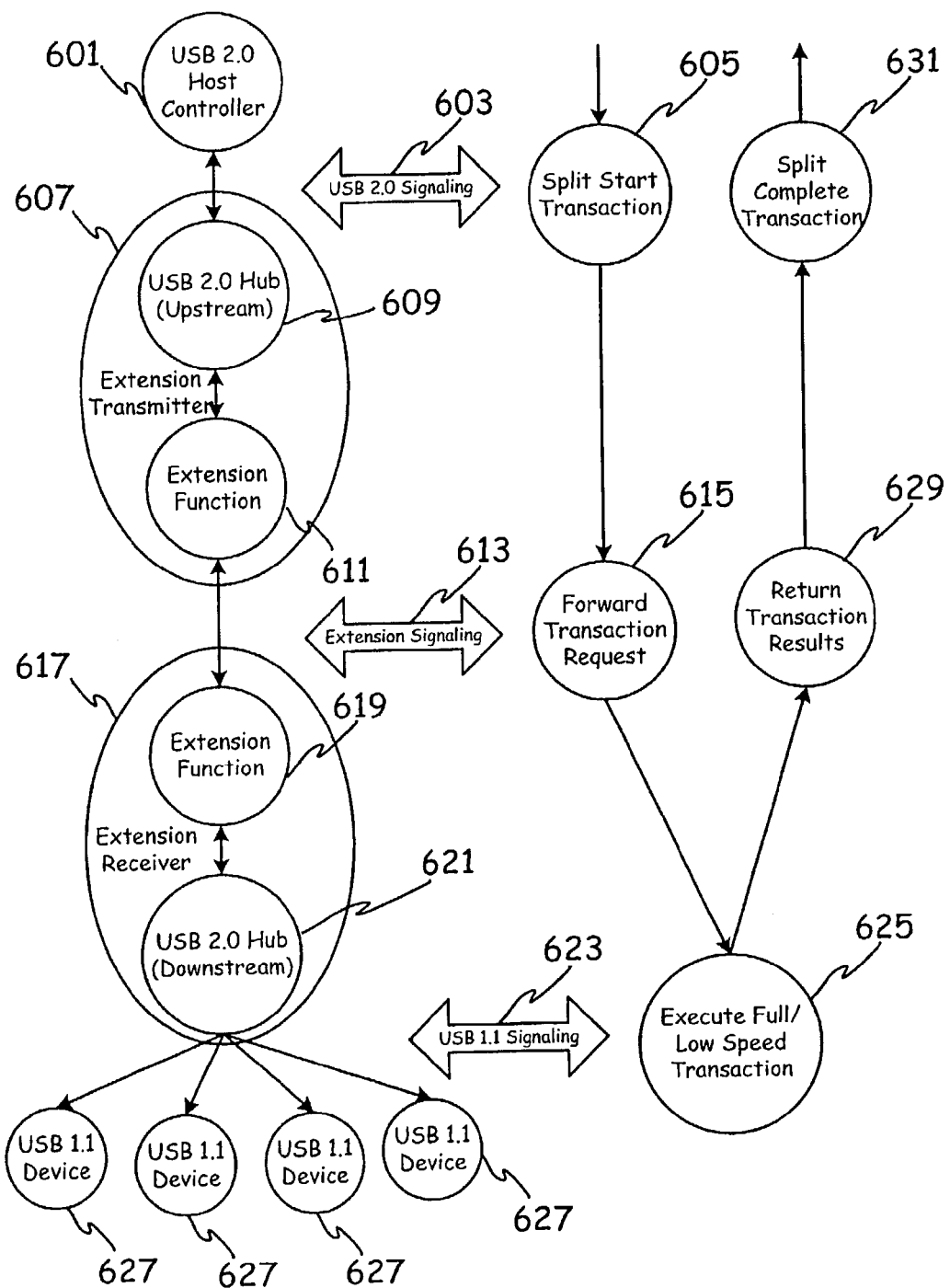
FIG. 6 is a flow diagram of the extension topology and operational flow of a basic computer interface extension solution incorporating USB split transactions in accordance with embodiments of the present invention.

FIG. 6 is a flow diagram of the extension topology and operational flow of a basic computer interface extension solution incorporating USB split transactions according to certain but not other aspects of the present invention. In the illustrated embodiment, a USB 2.0 Host Controller 601 operates at a host computer where USB 2.0 signaling 603 begins a split start transaction 605 (also known as a 'start-split' transaction). An extension transmitter 607 includes a USB 2.0 hub 609 and an extension function 611. The extension function 611 coordinates extension signaling 613 such that non-USB signals may be forwarded by a forward transaction request 615 to an extension receiver 617. The extension receiver 617 includes an extension function 619 that operates in conjunction with another USB 2.0 hub 621. With the assistance of at least the extension function 619, the USB hub 621 performs USB 1.1 signaling 623 to execute full/low speed transactions 625 with at least one USB 1.1 device 627.

In a similar manner, USB signals are sent to the USB 2.0 host controller 601 by passing from a USB 1.1 device 627 to the USB 2.0 hub 621 where the extension function 619 aids in the extension signaling 613 to send return transaction results 629. A split complete transaction 631 may then begin for the particular USB signaling that is being extended.

In other words, the USB 2.0 host controller 601 communicates with the extension transmitter 607, which includes the upstream USB 2.0 hub 609 and the extension function 611, via USB 2.0 signaling 603. The extension function 611 communicates via extension signaling 613 with the corresponding extension function 619 in the extension receiver 617. As previously stated, the extension receiver 617 includes the downstream USB 2.0 hub 621. The extension receiver 617 communicates via USB 1.1 signaling 623 to several USB 1.1 devices 627. In accordance with USB specification terminology, the terms "upstream" and "downstream" with respect to the USB 2.0 hub 609 and the USB 2.0 hub 621 are used in compliance with the specification terminology although, as will be understood by those of ordinary skill in the art and viewing this disclosure, in actual practice the communication is bi-directional so that what is upstream in one example could be downstream in another, and vice versa.

FIG. 7 is a diagram of the data flow of the method of the claimed subject matter as it applies to a USB multi-user switch. A USB 2.0 host controller 701 communicates with a USB 2.0 hub 703 in order to communicate with USB 1.1 devices 705. The USB 2.0 hub 703 communicates USB 2.0 upstream 707 and USB 1.1 downstream 709. A user transaction lockout filter 711, that may include snooping functions for pulling ID information and monitoring and controlling bus activity, is introduced to facilitate the non-USB signals that are the subject of the extension as previously described more fully herein.

In the illustrated embodiment, the USB 2.0 hub 703 function is best implemented in a USB 2.0 hub that only allows USB 1.1 connections downstream. This creates a natural split in the USB topology between 2.0 and 1.1 device transactions that can easily be intercepted during the conversion process. Using the split start and complete token requests, downstream transactions can be filtered before being initiated on the downstream ports. This avoids contention conditions associated with real-time snooping and interception of transactions already initiated on the bus.

Although a system and method has been described, the invention is not intended to be limited to the specific form set forth herein, but on the contrary, it is intended to cover such alternatives, modifications, and equivalents, as can be reasonably included within the spirit and scope of the invention as defined by the appended claims.

While various embodiments of the invention have been described, it will be apparent to those of ordinary skill in the art that many more embodiments and implementations are possible that are within the scope of this invention.

What is claimed is:

1. A method of sharing user resources in a computer system through a universal serial bus (USB) interface comprising:
    associating at least a first USB device with a first user and at least a second USB device with a second user;
    assigning the first user to a first USB port;
    assigning the second user to a second USB port;
    monitoring a USB transaction occurring between a USB device and the computer system to identify which USB device is participating in the monitored USB transaction;
    permitting the first user to temporarily assume control of the computer system through the first USB port for operation of the at least one USB device if the at least one USB device is the identified USB device; and
    blocking the second user from access to the computer system while the first user has temporary control of the computer system.

2. The method of claim 1 wherein the blocking of the second user from access to the computer system is limited to devices assigned to the first user.

3. The method of claim 1 wherein the first USB device is selected from the group consisting of a keyboard, a mouse, a joystick, and a USB human interface class device.

4. The method of claim 1 wherein the identification of which USB device includes identifying a device class for the USB device.

5. The method of claim 1 wherein the identification of which USB device comprises identifying through an application program that is resident on the computer system.

6. The method of claim 1 wherein the identification of which USB device includes monitoring a USB device driver for the USB device.

7. The method of claim 1 wherein monitoring a USB transaction comprises snooping of USB transactions that occur between a USB device and the computer system.

8. The method of claim 7 wherein signaling type for the snooping is selected from the group consisting of USB 1.1 protocol, USB 2.0 protocol, and split transaction protocol within the USB 2.0 definition.

9. The method of claim 1 wherein blocking of the second user comprises disabling the second USB port.

10. A USB communication system for sharing user resources comprising:
    a host computer system having a USB host controller, a first USB hub circuitry, and transmitter circuitry, the USB host controller being configured to operate using a split transaction for the USB communications;
    receiver circuitry having a second USB host circuitry that receives a non-USB format or USB communication signals as the signals appear between split start and split complete transaction operations at the host computer system, the transmitter circuitry being configured to forward the non-USB formatted USB communication signals across an extension between the transmitter circuitry and the receiver circuitry;
    a user transaction lockout filter disposed between the first USB hub circuitry and the second USB hub circuitry that performs snooping of the USB communication signals that appear between the split start and the split complete transaction operations at the host computer system;
    at least one USB user interface device communicatively coupled to the receiver circuitry that receives USB communication signals from the second USB hub circuitry, the USB communication signals corresponding to the non-USB formatted communication signals that appear between the split start and split complete transaction operations at the host computer system; and
    one or more users sharing the host computer system through the receiver circuitry and the transmitter circuitry, wherein the user transaction lockout filter identifies which of the one or more users sharing the host computer system is associated with the USB signals.

11. The USB communication system for sharing user resources of claim 10 wherein the one or more users that share the host computer system through the receiver circuitry are configured to block other users of the devices that are controlled by the one or more users.

* * * * *

UNITED STATES PATENT AND TRADEMARK OFFICE
CERTIFICATE OF CORRECTION

PATENT NO. : 6,993,620 B2  Page 1 of 1
APPLICATION NO. : 10/461895
DATED : January 31, 2006
INVENTOR(S) : Patrick Lee Ferguson It is certified that error appears in the above-identified patent and that said Letters Patent is hereby corrected as shown below:

In column 8, line 16, in Claim 10, delete "host circuitry" and insert -- hub circuitry --, therefor.

In column 8, line 17, in Claim 10, delete "or" and insert -- of --, therefor.

Signed and Sealed this

Seventh Day of July, 2009

JOHN DOLL
*Acting Director of the United States Patent and Trademark Office*